United States Patent
DeCesaris et al.

(10) Patent No.: US 9,480,042 B2
(45) Date of Patent: Oct. 25, 2016

(54) DYNAMIC IDENTIFIER MODIFICATION OF PHYSICAL RESOURCES FOR RESOURCE DISCOVERY IN A DATA CENTER

(71) Applicant: LENOVO ENTERPRISE SOLUTIONS (SINGAPORE) PTE. LTD. CORPORATION, New Tech Park (SG)

(72) Inventors: Michael DeCesaris, Carrboro, NC (US); Luke D. Remis, Raleigh, NC (US); John K. Whetzel, Holly Springs, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/572,198

(22) Filed: Dec. 16, 2014

(65) Prior Publication Data

US 2016/0174184 A1    Jun. 16, 2016

(51) Int. Cl.
| | |
|---|---|
| *H04W 64/00* | (2009.01) |
| *H04W 76/02* | (2009.01) |
| *H04W 8/00* | (2009.01) |
| *H04L 29/08* | (2006.01) |
| *H04W 8/26* | (2009.01) |
| *H04W 84/12* | (2009.01) |
| *H04W 84/18* | (2009.01) |

(52) U.S. Cl.
CPC .............. *H04W 64/00* (2013.01); *H04L 67/00* (2013.01); *H04W 8/005* (2013.01); *H04W 8/26* (2013.01); *H04W 76/021* (2013.01); *H04W 84/12* (2013.01); *H04W 84/18* (2013.01)

(58) Field of Classification Search
CPC .. H04W 64/00; H04W 8/005; H04W 76/021
See application file for complete search history.

(56) References Cited

U.S. PATENT DOCUMENTS

| | | | |
|---|---|---|---|
| 7,720,044 B1 | 5/2010 | Rainisto | |
| 2013/0217332 A1* | 8/2013 | Altman | H04H 60/90 455/41.2 |
| 2013/0254369 A1 | 9/2013 | Rogel et al. | |
| 2015/0181548 A1* | 6/2015 | Varoglu | H04W 64/00 455/456.2 |

FOREIGN PATENT DOCUMENTS

KR    2005015048    8/2003

OTHER PUBLICATIONS

"A method for person identification with directional Bluetooth signal," IBM, Oct. 2006.
"Secondary Calculated Bluetooth ID for Presence," IBM, Mar. 2009.

* cited by examiner

*Primary Examiner* — Kashif Siddiqui
*Assistant Examiner* — Minjung Kim
(74) *Attorney, Agent, or Firm* — Steven M. Greenberg, Esq.; CRGO Law

(57) ABSTRACT

Embodiments of the invention provide a method, system and computer program product for dynamically locating a device within a data center. A method for dynamically locating a device within a data center includes wirelessly receiving in a fixed device amongst a multiplicity of devices in a data center, a request from a mobile device to locate a target device amongst the devices. The method also includes broadcasting a request to the multiplicity of devices to establish respective wireless identifiers based upon a proximity of each of the multiplicity of the devices to the target device relative to adjacent ones of the devices. The method yet further includes establishing a wireless identifier for the fixed device based upon a wireless identifier of an adjacent one of the devices. Finally, the method includes returning to the mobile device by the fixed device the established wireless identifier for the fixed device.

12 Claims, 2 Drawing Sheets

DYNAMIC IDENTIFIER MODIFICATION OF PHYSICAL RESOURCES FOR RESOURCE DISCOVERY IN A DATA CENTER

BACKGROUND OF THE INVENTION

1. Field of the Invention

The present invention relates to inventory management in a data center and more particularly to locating physical resources in a data center.

2. Description of the Related Art

A data center is a facility used to house computer systems and associated components, such as telecommunications and storage systems. The typical data center generally includes not only a multiplicity of servers, both stand alone and rack mount, but also communication switching devices, redundant or backup power supplies, environmental controls including air conditioning and fire suppression and security devices. Oftentimes, different sets of servers and associated switches are stored in cabinets within the data center or on racks in the data center, with those cabinets or racks organized in rows just as may be the case with bookshelves in a library.

In any data center environment, it is necessary to locate a particular physical hardware device for several reasons—for example, to address a fault or other condition accessible only through direct physical access to the hardware device. However, the location of a hardware device in a datacenter can differ from a specific rack or cabinet number in a particular location, to a slot within a chassis located in a specific rack or cabinet in a particular location. Further, without a specific map of the location of different devices in a data center, merely knowing a device name does not help one locate the device.

One solution is an integrated map of the full data center, mapping specific systems to given slots in a rack. The integrated map, though, must be meticulously updated in order to be successfully used to locate different devices in the data center. As such, if a device is moved, even for a brief period, problems arise. In any event, the requirement to locate a device typically arises when the device is first installed—prior to the updating of an integrated map. Therefore, more advanced technological solutions are required. Current solutions address the complexity of locating individual hardware components in the data center through the utilization of several technologies such as universal product codes (UPC) and radiofrequency identification (RFID) tags. These methods require the personnel to carry a device to read the UPC or RFID values, as they are not generally human-readable. Methods such as RFID also suffer from the problem of having multiple responses to a local read, since many tags will respond to a read action from the user. UPC suffers from the requirement of having to scan each code individually, which requires the personnel to scan multiple systems to find the specific one being sought.

As a more general method of locating elements in the data center without a specific identification tag, visual indicators, such as LEDs may be illuminated to draw attention to components in need of service. Even still, one must be within eye-shot of an illuminated LED to locate a corresponding element and further, once within eye-shot, these lights may be lost in the sea of other status and activity LEDs that are commonly present on the front and back panels of a data center device.

BRIEF SUMMARY OF THE INVENTION

Embodiments of the present invention address deficiencies of the art in respect to device management in a data center and provide a novel and non-obvious method, system and computer program product for dynamically locating a device within a data center. In an embodiment of the invention, a method for dynamically locating a device within a data center is provided. The method includes wirelessly receiving in a fixed device amongst a multiplicity of devices in a data center, a request from a mobile device to locate a target device amongst the multiplicity of the devices. The method also includes broadcasting a request to the multiplicity of devices to establish respective wireless identifiers based upon a proximity of each of the multiplicity of the devices to the target device relative to adjacent ones of the devices. The method yet further includes establishing a wireless identifier for the fixed device based upon a wireless identifier of an adjacent one of the devices. Finally, the method includes returning to the mobile device by the fixed device the established wireless identifier for the fixed device.

In another embodiment of the invention, a device location data processing system is configured for dynamically locating a device within a data center. The system includes a host computing system that includes one or more computers each with memory and at least one processor. The system also includes a wireless transceiver transmitting and receiving data wirelessly, for example a Bluetooth transceiver or a Wi-Fi transceiver. Finally, the system includes a relative tree generation module executing in the memory of the host computing system. The module includes program code enabled upon execution to respond to a receipt in the wireless transceiver of a request from a mobile device to locate a target device amongst a multiplicity of devices in a data center by broadcasting a request to the multiplicity of devices to establish respective wireless identifiers based upon a proximity of each of the multiplicity of the devices to the target device relative to adjacent ones of the devices, by establishing a wireless identifier for the wireless transceiver based upon a wireless identifier of an adjacent one of the devices and by directing the wireless transceiver to return to the mobile device the established wireless identifier for the wireless transceiver.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for locating a device within a data center. In accordance with an embodiment of the invention, a wireless query can be initiated by each of multiple different devices in a data center to locate a target device associated with a specific device identifier. Each device in the data center able to wirelessly detect the target device can change a corresponding device identifier to reflect a proximity to the target device. Further, each device in the data center unable to wirelessly detect the target device, but able to detect a device within proximity to the target device can change a corresponding device identifier to reflect a proximity to a device within the data center that enjoys a proximity to the target device.

Finally, each device in the data center unable to wirelessly detect the target device and unable to detect a device within proximity to the target device, but able to detect a device that enjoys proximity to a device that enjoys proximity to another device that enjoys proximity to the target device can change a corresponding device identifier to reflect a proximity to a device that enjoys proximity to a device that enjoys proximity to another device that enjoys proximity to the target device. In this way, a queryable hierarchy of device identifiers is constructed reflecting a proximity of each device to a target device.

Figure 1:
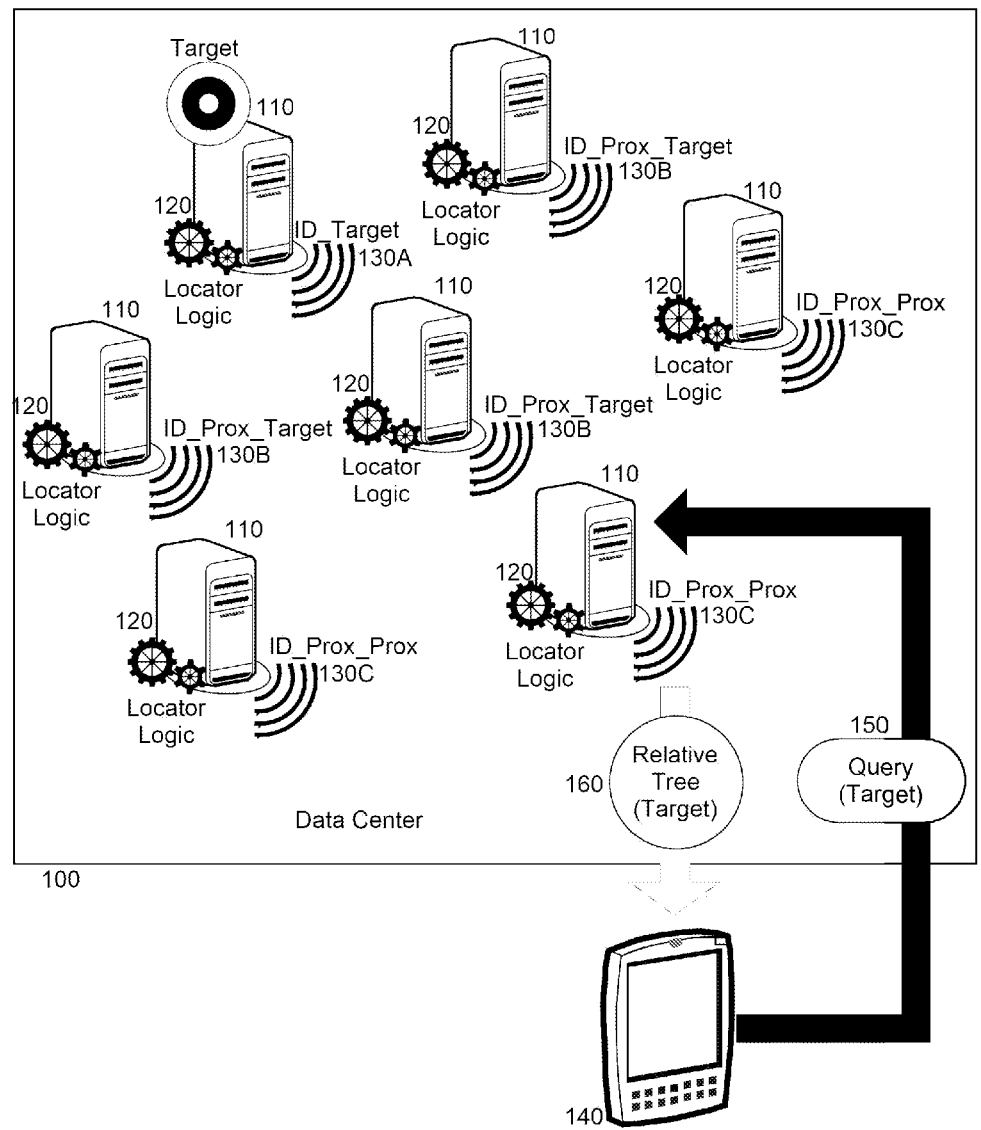
FIG. 1 is a pictorial illustration of a process for dynamically locating a device within a data center.

In further illustration, FIG. 1 pictorially shows a process for dynamically locating a device within a data center. As shown in FIG. 1, different devices 110 can be disposed within a data center 100. The different devices 110 can include, by way of a example, different servers, different switches, or different computing appliances, for instance. Each of the devices 110 can include locator logic 120. The locator logic 120 can operate to dynamically modify a wireless identifier 130A, 130B, 130C depending upon a proximity to a specified target one of the devices 110. The locator logic 120 further can operate to respond to a location query 150 by a pervasive device 140 to locate the target one of the devices 110 by returning to the pervasive device 140 a dynamically constructed relative hierarchy 160 of ones of the devices 110 based upon the target one of the devices 110.

In this regard, in response to receiving the location query 150 the locator logic 120 receiving the location query 150 can broadcast a directive to all devices 110 to locate the target one of the devices 110. The target one of the devices 110 upon receiving the directive can change its wireless identifier 130A to reflect its status as the target one of the devices 110. Thereafter, the wireless identifier 130A can be broadcast by the target one of the devices 110 to proximate ones of the devices 110. The locator logic 120 of the proximate ones of the devices can detect the proximity to the target one of the devices 110 and in turn, can change their respective wireless identifiers 130B to reflect their status as being proximate to the target one of the devices 110. The locator logic 120 of ones of the devices 110 proximate only to devices 110 proximate to the target one of the devices 110 in turn can change their wireless identifiers 130C to reflect their status as being only proximate to ones of the devices 110 which are proximate to the target one of the devices 110.

In this way, the pervasive device 140 can receive a relative tree from a given one of the devices 110 that indicates a relative distance of the pervasive device 140 from the target one of the devices 110 in the data center 100. As the pervasive device 140 changes position within the data center 100, the pervasive device 140 can receive additional relative trees 160 from others of the devices 110 so as to determine whether or not the pervasive device 140 has moved closer to the position of the target one of the devices 110. Consequently, the target one of the devices 110 can be more readily located within the data center 100 despite the presence of a multiplicity of devices 110 within the data center 100.

Figure 2:
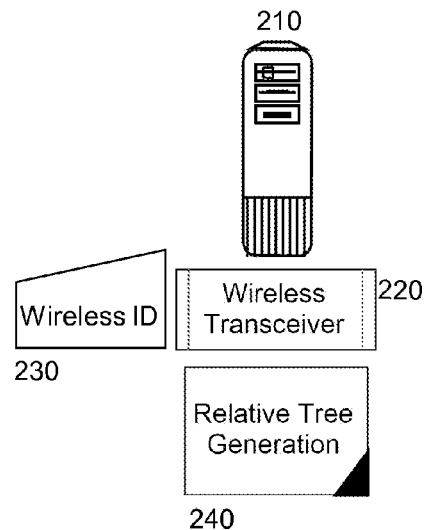
FIG. 2 is a schematic illustration of a device location data processing system configured for dynamically locating a device within a data center; and, FIG. 3 is a flow chart illustrating a process for dynamically locating a device within a data center.

The process described in connection with FIG. 1 can be implemented within a device location data processing system. In yet further illustration, FIG. 2 schematically shows a device location data processing system configured for dynamically locating a device within a data center. The system includes a host computing system 210 that includes at least one computer with memory and at least one processor. The host computing system 210 further includes a wireless transceiver 220 configured to both transmit and receive data wirelessly, for instance a short range radio frequency transmitter-receiver such as a Bluetooth transmitter-receiver, or a local area wireless transceiver transmitting and receiving packets of data utilizing any of the Institute for Electrical and Electronic Engineers (IEEE) 802.11 standard data transmission protocols.

Of note, a relative tree generation module 240 can execute in the memory of the host computing system 210. The module 240 can include program code that when executed within the host computing system 210 is enabled to establish a wireless identifier 230 to be broadcast by the wireless transceiver 220 based upon a proximity of the host computing system 210 to a designated target device. To the extent that the host computing system is included as part of the target device, the program code of the module 240 can establish the wireless identifier 230 to indicate that the host computing system 210 is the target device.

Otherwise, the program code of the module 240 can determine whether or not the host computing device 210 is proximately positioned adjacent to the target device. If so, the program code of the module 240 can establish the wireless identifier 230 to indicate the proximity of the host computing system 210 as being adjacent to the target device. To the extent the program code determines that the host computing device 210 is not proximately positioned adjacent to the target device, the program code of the module 240 can determine whether or not the host computing device 210 is proximately positioned adjacent to another host computing system that indicates in its respective wireless identifier that it is positioned adjacent to the target device. If so, the program code of the module 240 can establish the wireless identifier 230 to indicate that the host computing device 210 is proximately positioned adjacent to another host computing system that indicates in its respective wireless identifier that it is positioned adjacent to the target device. In this way, the wireless identifier 230 can indicate a relative hierarchy of proximity between the host computing system 210 and the target device.

Figure 3:
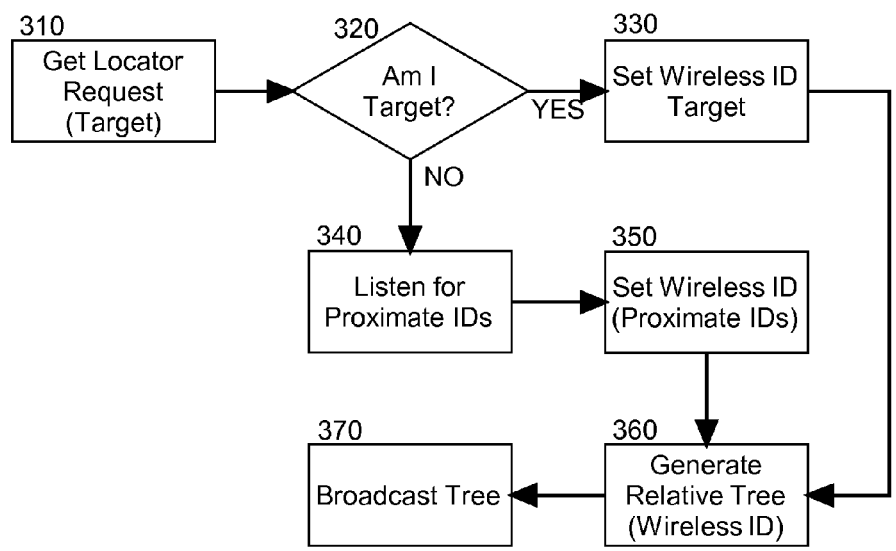

In even yet further illustration of the operation of the relative tree generation module 240, FIG. 3 is a flow chart illustrating a process for dynamically locating a device within a data center. Beginning in block 310, a locator request can be wirelessly received in a fixed device in the data center from a mobile device in the data center, for instance a smart phone or tablet computer. The locator request can be broadcast over Wi-Fi, near field communications, Bluetooth or other short range to medium range wireless communications medium. In decision block 320, in can be determined by the fixed device whether or not the fixed device is the requested target device. If so, in block

330, a wireless identifier for the fixed device can be changed to reflect that the fixed device is the target device. Otherwise, the process can proceed through block 340.

In block 340, if the fixed device is determined not to be the target device, proximate wireless communications can be received indicating the wireless identifier of one or more adjacent devices in the data center. In response, in block 350 the wireless identifier of each adjacent device can be inspected in order to determine whether or not any of the adjacent devices are the target device, or whether or not any of the adjacent devices are proximately positioned adjacent to the target device, or whether or not any of the adjacent devices are proximately positioned adjacent to a device that is proximately positioned adjacent to the target device, and so forth. Subsequently, in block 350, a wireless identifier for the fixed device is modified to indicate the proximate nature of the fixed device relative to its adjacent devices.

In block 360, a relative tree can be generated for the fixed device with respect to one or more adjacent devices and broadcast to a requesting mobile device in block 370. The relative tree indicates a proximity of the fixed device to the target device. For instance, a wireless identifier of the fixed device indicating that the fixed device is proximate to a device adjacent to a device adjacent to a device adjacent to the target device indicates that three layers of devices exist between the fixed device and the target device. In contrast, a wireless identifier of the fixed device indicating adjacency to the target device indicates that the device immediately adjacent to the fixed device is in fact, the target device. Consequently, the strategic determination of a wireless identifier of each fixed device in the data center can act to indicate on demand to the mobile device how close the mobile device is relative to the target device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for dynamically locating a device within a data center, the method comprising:
    wirelessly receiving in a receiving fixed device amongst a multiplicity of fixed devices in a data center, a request from a mobile device to locate a target fixed device amongst the multiplicity of the fixed devices;
    broadcasting a request to the multiplicity of fixed devices to establish respective wireless identifiers based upon a proximity of each of the multiplicity of the fixed devices to the target fixed device relative to adjacent ones of the fixed devices;
    establishing a wireless identifier for the receiving fixed device based upon a wireless identifier of an adjacent one of the fixed devices to reflect a status of the receiving fixed device as being proximate to the target fixed device unless the receiving fixed device is the target fixed device in which case the wireless identifier is established to reflect the status of the receiving fixed device as the target fixed device; and,
    returning to the mobile device by the receiving fixed device the established wireless identifier for the receiving fixed device.

2. The method of claim 1, wherein the request is received wirelessly by way of Wi-Fi.

3. The method of claim 1, wherein the request is received wirelessly by way of Bluetooth.

4. The method of claim 1, wherein the target device incorporates a name of the target extracted from the request within a wireless identifier established for the target device.

5. A device location data processing system configured for dynamically locating a device within a data center, the system comprising:
    a host computing system comprising one or more computers each with memory and at least one processor;
    a wireless transceiver transmitting and receiving data wirelessly; and,
    a relative tree generation module executing in the memory of the host computing system, the module comprising program code enabled upon execution to respond to a receipt in the wireless transceiver of a request from a mobile device to locate a target fixed device amongst a multiplicity of fixed devices in a data center by broadcasting a request to the multiplicity of fixed devices to establish respective wireless identifiers based upon a proximity of each of the multiplicity of the fixed devices to the target device relative to adjacent ones of the fixed devices, by establishing a wireless identifier for the wireless transceiver based upon a wireless identifier of an adjacent one of the fixed devices to reflect a status of the receiving fixed device as being proximate to the target fixed device unless the receiving fixed device is the target fixed device in which case the wireless identifier is established to reflect the status of the receiving fixed device as the target fixed device and by directing the wireless transceiver to return to the mobile device the established wireless identifier for the wireless transceiver.

6. The system of claim 5, wherein the wireless transceiver is a Wi-Fi transceiver.

7. The system of claim 5, wherein the wireless transceiver is a Bluetooth transceiver.

8. The system of claim 5, wherein the target device incorporates a name of the target extracted from the request within a wireless identifier established for the target device.

9. A non-transitory computer program product for dynamically locating a device within a data center, the non-transitory computer program product comprising a computer readable storage medium having program instructions embodied therewith, the program instructions executable by a device to cause the device to perform a method comprising:
    wirelessly receiving in a receiving fixed device amongst a multiplicity of fixed devices in a data center, a request from a mobile device to locate a target fixed device amongst the multiplicity of the fixed devices;

broadcasting a request to the multiplicity of fixed devices to establish respective wireless identifiers based upon a proximity of each of the multiplicity of the fixed devices to the target fixed device relative to adjacent ones of the fixed devices;

establishing a wireless identifier for the receiving fixed device based upon a wireless identifier of an adjacent one of the fixed devices to reflect a status of the receiving fixed device as being proximate to the target fixed device unless the receiving fixed device is the target Fixed device in which case the wireless identifier is established to reflect the status of the receiving fixed device as the target fixed device; and, returning to the mobile device by the receiving fixed device the established wireless identifier for the receiving fixed device.

10. The computer program product of claim 9, wherein the request is received wirelessly by way of Wi-Fi.

11. The computer program product of claim 9, wherein the request is received wirelessly by way of Bluetooth.

12. The computer program product of claim 9, wherein the target device incorporates a name of the target extracted from the request within a wireless identifier established for the target device.

* * * * *